July 22, 1958  J. R. TRAVIS  2,844,793
GALVANOMETER
Filed Dec. 19, 1952

INVENTOR.
JOHN R. TAVIS
BY
*James E. Christie*
ATTORNEY

United States Patent Office 2,844,793
Patented July 22, 1958

2,844,793

GALVANOMETER

John R. Tavis, Los Angeles, Calif., assignor, by mesne assignments, to Consolidated Electrodynamics Corporation, Pasadena, Calif., a corporation of California Application December 19, 1952, Serial No. 326,899

1 Claim. (Cl. 324—154)

This invention relates to improvements in galvanometers of the type adapted to respond to alternating or oscillating voltages and more particularly to the type of laboratory and portable galvanometers finding widespread use in oscillographs.

A typical galvanometer of this character comprises a lightweight fine wire coil held in suspension between a pair of stretched wires or ribbons respectively anchored at opposite ends to an enclosing galvanometer case. The suspension means defines the axis of rotary motion of the coil and supports a small mirror which is generally symmetrically arranged about this axis for deflection responsive to rotation of the coil. A window in the galvanometer case aligned with the mirror enables incidence and reflection of a light beam at the mirror for sensing coil displacement. A pair of pole pieces are mounted through opposite walls of the case to define a narrow gap interiorly of the case and within which the coil is located. The pole pieces extend outwardly of the case for suitable engagement with magnet means as of an oscillograph.

The coil suspension means in the form of conductive wire or ribbon provide electrical leads to the coil, one suspension means conventionally being anchored to a terminal post sealed through an end of the galvanometer case and providing one external contact. The other suspension means is generally resiliently anchored, as by a captive spring, the tension of which may be varied by screw adjustment of a sliding wafer to which one end of the spring is anchored. In present practice a fine wire lead is attached to the spring or spring anchoring means and is carried upwardly in the casing and through a side wall thereof into a terminal housing wherein it is mechanically held in contact with a second terminal post. Improvements in the method of making external contact with this suspension means are described in my co-pending application Serial No. 326,080, filed December 15, 1952.

Usually the upper suspension means carries the mirror and is anchored to the end mounted terminal post while the lower suspension means is resiliently anchored as described. The description and drawings assume this relationship although there is no such limitation in fact.

The principle of operation of a galvanometer of this type together with its mode of use is thoroughly familiar in the art.

One of the problems ever present in the development of a reliable galvanometer is the attainment of static and dynamic balance stability and temperature insensitivity. These characteristics are largely a function of the nature of the suspension system, which terminology is employed throughout the present specification and claim as including the galvanometer coil and the upper and lower suspension ribbons or wires. I have now developed an improved suspension system differing in many respects from presently conventional systems, and exhibiting balance stability both under static and dynamic conditions and temperature insensitivity to a degree not heretofore attained.

In accomplishing these objects, the invention contemplates in a galvanometer having a case and magnet pole pieces extending inwardly of the case to define an intervening gap, the combination comprising a wire coil suspended in the gap and composed of a plurality of turns of wire wound about upper and lower spaced bobbins, first suspension means anchored at one end to the case and forming at its opposite end a first loop circumscribing one coil bobbin, second suspension means anchored at one end to the case and forming at its opposite end a second loop circumscribing the other coil bobbin, opposite ends of the wire coil being respectively bonded to one leg of the first and second suspension loops.

It has been conventional in the past to form a loop on the coil end of each of upper and lower suspension means, the loop engaging around the coil end pieces and with an end of the coil wrapped at least once around the loop and fastened to the respective suspension means at a point spaced from the loop terminal. I have found that by bonding the terminal ends of the coil wire to one leg of the loop itself, and preferably as close to the coil as possible, both balance and temperature stability are greatly improved. The reason for this is not thoroughly understood although at least in part accountable by the consequent shorter free terminal of the coil wire.

A further element of the invention is the use of coil bobbins of mineral form such as synthetic jewels which, as far as is known, represents the first use of such material for this purpose. Heretofore plastic or ivory bobbins have been conventional but we have found that the mineral form bobbins exhibit improved balanced stability, presumably as a consequence of the greater stability thereof with respect to temperature and humidity. Further, in the same end, I prefer to employ as an adhesive for bonding the several turns of the coil and the suspension loops to the bobbins, a polymerizing plastic cement or lacquer in contrast to the previously employed evaporative drying cements. I have found that these polymerizing materials exhibit a lower sensitivity to variations in temperature and pressure than the previously employed adhesives.

A further feature of the invention directed again to improved balance stability resides in the application of balancing weights to the suspension means rather than to the coil itself, as is presently conventional practice. It has been found that such balancing weights should be located as close to the center of rotation as possible, which objective is more nearly accomplished by affixing such weights to the suspension means itself rather than to the coil, since the exterior surfaces of the coil are inherently spaced outwardly from the axis of coil rotation. The balancing weights employed in accordance with the invention are composed of a dense metal, such as gold, shaped to accomplish, with a minimum of mass, balance stability in all necessary planes and as more extensively discussed hereinafter.

The invention will be more clearly understood with reference to the following detailed description thereof as taken in conjunction with the accompanying drawing, in which.

Figure 1:
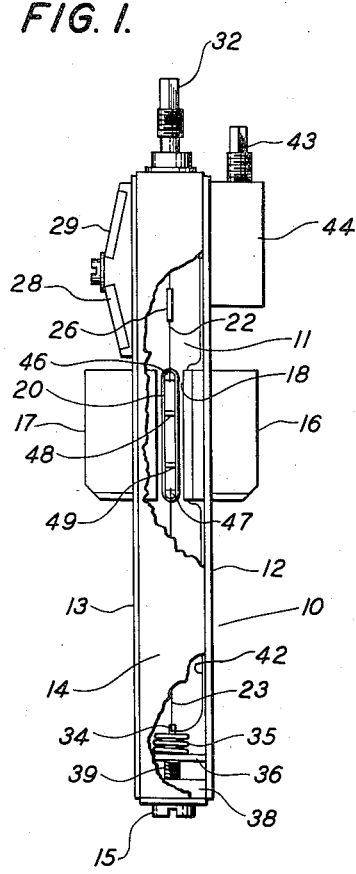
Fig. 1 is an elevation of a galvanometer with a portion of the front wall of the case cut away.

The galvanometer shown in elevation in Fig. 1 comprises a case 10 in the form of a square or rectangularly sectioned box, the length of which is many times its cross sectional dimensions. The case comprises an elongated back strip 11 and two side strips 12, 13. A cover 14 of substantially the same shape as the back member 11 slidably engages in grooves (not shown) adjacent the front edges of the side members 12 and 13. The cover is held on the case by a screw 15 and may be removed for access to the interior of the case by removal of the screw.

A pair of pole pieces 16, 17 are mounted through sides 12 and 13 respectively of the case defining a relatively narrow gap 18 within the case symmetrically arranged about the longitudinal axis thereof. Pole pieces 16 and 17 extend outwardly from the side walls 12 and 13 and are adapted for engagement in a suitable magnet block (not shown). An elongated coil 20 is suspended in the gap 18 between the pole pieces 16 and 17 by upper and lower suspension wires 22, 23 respectively. The suspension wires are connected to the coil termini to provide electrical leads to the coil. A small rectangular mirror 26 is attached to the upper suspension wire in alignment with a window (not shown) in the side wall 13 of the case whereby a beam of light may be directed through one or the other of rotatably mounted lenses 28, 29 on the mirror and reflected back through the window and associated lens for sensing deflection of the coil 20.

The upper suspension wire is anchored to a terminal post 32, the manner of mounting the same through the end of the case 10 being conventional in this instance.

The lower suspension wire 23 is bonded to a hook 34 which in turn engages one end of a helical spring 35, the spring being affixed at its opposite end to a slidable wafer 36. A block 38 is mounted at the bottom of the case, furnishing a receptable for screw 15 and a base for an adjusting screw 39 threadably engaging the wafer 36. By means of screw 39 tension on spring 35 and suspension wire 23 may be adjusted by displacing the wafer 36 longitudinally in the case.

A fine wire lead 42 is bonded at one end to the hook 34, conveniently by soldering, and is carried upwardly in the case for connection to a second external contact or terminal post 43 anchored in a terminal housing 44.

The various features of the invention, which combine to result in a galvanometer of improved characteristics, are best described with relation to Figs. 2, 3, 4 and 5. Coil 20, as shown diagrammatically in Fig. 1, is shown in partial elevation in the enlarged view of Fig. 2, and comprises a multiplicity of turns of fine wire 20A wrapped around oppositely located upper and lower bobbins 46, 47 respectively, the bobbins as previously mentioned being preferably small jewels. Such jewels are commercially available in the form of so-called synthetic sapphires ($Al_2O_3$) and in the semi-cylindrical shape as illustrated. Any mineral material such as the natural or synthetic jewels may be used in preference to the organic plastics heretofore employed. Even certain metals are satisfactory for this purpose.

Figure 3:
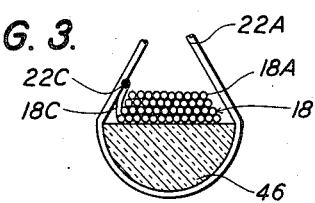
Fig. 3 is an enlarged vertical section of the upper end of the coil as taken on a plane normal to the drawing of Fig. 1.

As shown in the enlarged transverse section of Fig. 3, the wire 20A is wrapped in overlying rows with succeeding rows having a smaller number of turns so that the exterior boundaries of a section taken through the coil define an isosceles trapezoid, the base of which is at the inner circumference of the coil. A loop 22A is formed on the lower end of suspension wire 22 by means of a separate wire anchored at opposite ends to the terminus of the suspension wire preferably being bonded thereto, the bond being reinforced by a turn of copper wire 22B. The loop is carried under the semi-circular surface of the bobbin 46 conforming to this shape, the two legs of the loop extending from the upper surface of the bobbin in approximately straight lines to the point of junction with the suspension wire 22.

As heretofore mentioned, it has previously been the practice to carry one terminal of the coil wire 20A through at least one turn around the suspending loop to be anchored to the suspension wire above or at the loop junction. In the galvanometer as herein described one terminal end of the coil wire 20A is bonded to a leg of the loop 22A at or approximately at the most closely adjacent point so as to minimize the non-conforming extension of the coil terminal. This arrangement is illustrated more clearly in the enlarged transverse partial section of Fig. 3, showing terminal end 20C of the coil wire 20A anchored to one leg of loop 22A as by bonding at a point 22C located closely adjacent the corresponding terminal loop of the coil 20.

The lower end of the coil is supported on bobbin 47 in an identical manner, the bobbin 47 in turn being engaged by a loop (not shown) formed on the appropriate end of lower suspension wire 23 and the other coil terminal being similarly bonded to one leg of this corresponding loop.

Figure 4:
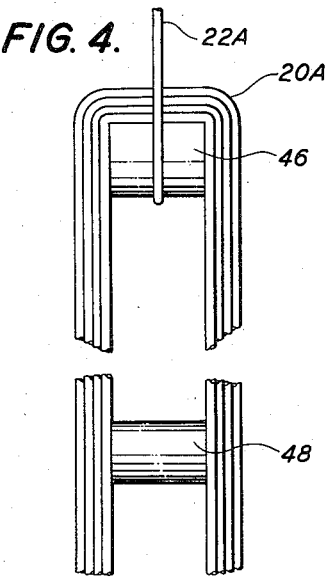
Fig. 4 is an enlarged partial front elevation of the coil shown in Fig. 1.

The relationship of the suspension loop coil and supporting bobbin 46 is shown in the enlarged partial front elevation view of Fig. 4 in which the several layers of wire 20A forming the coil are evident with the loop 22A circumscribing the curvilinear under surface of the bobbin 46.

To maintain the proper coil symmetry, spacer pins 48, 49 are interposed between the two sides of the coil in the region between the bobbins 46, 47. Spacer pins are also preferably of mineral composition and are of a diametral dimension approximating the base of the trapezoidal coil section, as evidenced in Fig. 2.

Figure 2:
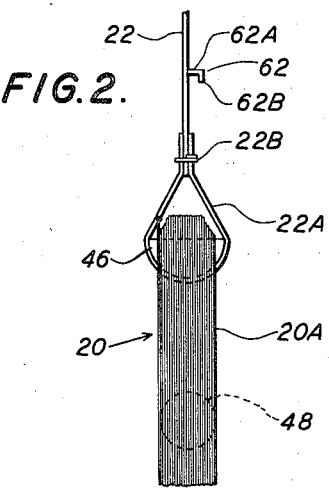
Fig. 2 is an enlarged side elevation of a portion of the galvanometer coil and upper suspension means.
Figure 5:
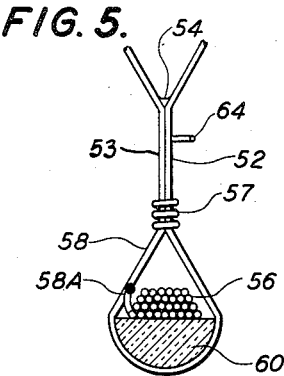
Fig. 5 is an enlarged transverse section taken through an end of the coil showing alternative suspension means.

A modification of the suspension arrangement shown in Fig. 2 is illustrated in the enlarged partial sectional elevation of Fig. 5. Two wire strands 52, 53, are bonded together at junction 54 immediately below the mirror (not shown), the separated strands supporting the mirror above this junction. The strands are held together below the junction by a plurality of turns of copper wire 57, the double strands forming a loop 58 downwardly of the binding wire 57 supporting coil bobbin 60 and to one leg of which one coil terminal is bonded, as at 58A.

After the coil is wound and suspended in the galvanometer case as illustrated with the best balance achievable by adjustment of the supporting suspension means, it is generally necessary to artificially balance the suspension system so that the coil will exhibit no deflection regardless of the orientation of the galvanometer in space. Thus it is necessary that the coil be balanced with the galvanometer in a horizontal position, vertical position, or in any intermediate position. Very frequently, therefore, two degrees of balance are necessary. At the same time I have found that it is important that any weight added to the suspension system for the purpose of achieving precise static balance should be located as close to the axis of coil rotation as possible so as to result in a minimum of effect on dynamic balance.

Accordingly, in the suspension means of the present invention balancing weights are affixed directly to the upper suspension wire or ribbon rather than to the coil, as has been conventional practice. This places the weight practically on the axis of coil rotation with a consequent reduction in torque effects attendant upon the effects of such weight under dynamic conditions. In Fig. 2 a balance weight 62 is affixed to the upper suspension wire 22 above the junction of loop 22A. In Fig. 5 a balance weight 64 is affixed directly to the upper suspension means above the wrapping 57 defining the loop 58.

As mentioned, it is frequently necessary to balance the coil with respect to perpendicular vectors which I have found can be accomplished with a single weight in the form of an elbow as illustrated with one arm 62A of the elbow projecting perpendicularly from the suspension wire 22 and a second arm 62B being perpendicular to the first arm and being oriented in a plane necessary to achieve balance. By using dense metallic balance weights, as for example gold, and by effecting complete balance with a single weight so shaped as to balance in one or more necessary planes of influence, a minimum of adjustment is required and a maximum of dynamic balance stability is insured. If a multiplicity of weights are used to balance in different planes of influence they each inherently affect the balance in other planes and it becomes a question of trial and error to arrive at the desired static balance stability in all orientations. With a single weight so shaped as to accomplish the purpose of such a multiplicity of weights, and as illustrated in Figs. 2 and 5, balance is more readily achieved with a minimum mass addition to the system.

Since suspension system balance is a function of weight, weight distribution and size, improved balance characteristics will result from any reduction in sensitivity to humidity or temperature changes which affect any of these three vectors. In this respect and as mentioned above, I have found that a mineral bobbin conveniently in the nature of commercially available synthetic sapphire elements improves the balance stability of a coil when replacing the plastic or ivory bobbins heretofore employed. Presumably this is a consequence of the lower sensitivity of such jewels or synthetic jewels to distortion under the influence of temperature or humidity changes. Also of importance is the binder used to solidify the coil into a rigid unit and to bond the coil and suspension means to the bobbin. It has been the practice to employ evaporative drying adhesives which I have now found have an objectionable temperature and humidity sensitivity. In accordance with the invention this type of adhesive is replaced by polymerizable cements or lacquer such as Bakelite products wherein hardening is a consequence of a chemical inter-action rather than solvent evaporation. After application of the particular polymerizable cement or lacquer selected for the purpose, the system is heated to a polymerizing temperature generally in the region of 250° to 300° F. It should be noted that the use of mineral bobbins as herein disclosed makes possible the use of such polymerizable cements since the temperature necessary to induce polymerization of these superior adhesives is excessive if the presently conventional plastic bobbins are employed.

I claim:

In a galvanometer having a case and magnet pole pieces extending inwardly of the case to define an intervening gap, the combination comprising upper and lower spaced sythetic jewel bobbins made of aluminum oxide, a wire coil suspended in the gap and composed of a plurality of turns of wire wound about the bobbins, upper suspension means anchored at one end to the case and having at its opposite end a loop circumscribing the upper bobbin, lower suspension means anchored at one end to the case and having at its opposite end a loop circumscribing the lower bobbin, one end of the wire coil being bonded to one leg of the upper suspension loop, the other end of the coil being bonded to one leg of the lower suspension loop, a polymerizable adhesive attaching the coil and the respective suspension loops to the bobbins.

References Cited in the file of this patent

UNITED STATES PATENTS

| | | |
|---|---|---|
| 2,045,677 | Schock | June 30, 1936 |
| 2,519,591 | Morrow | Aug. 22, 1950 |
| 2,550,720 | Richardson | May 1, 1951 |
| 2,605,303 | Hathaway | July 29, 1952 |
| 2,622,118 | Hendricks | Dec. 16, 1952 |
| 2,633,480 | Staff | Mar. 31, 1953 |
| 2,691,142 | Richardson | Oct. 5, 1954 |

FOREIGN PATENTS

| | | |
|---|---|---|
| 566,106 | Great Britain | Dec. 13, 1944 |